United States Patent
Santana et al.

(10) Patent No.: US 11,109,576 B2
(45) Date of Patent: Sep. 7, 2021

(54) LIVESTOCK MANAGEMENT

(71) Applicant: INTERNATIONAL BUSINESS MACHINES CORPORATION, Armonk, NY (US)

(72) Inventors: Vagner Figueredo de Santana, Sao Paulo (BR); Alecio Pedro Delazari Binotto, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 474 days.

(21) Appl. No.: 16/193,047

(22) Filed: Nov. 16, 2018

(65) Prior Publication Data

US 2020/0154694 A1 May 21, 2020

(51) Int. Cl.
*A01K 57/00* (2006.01)
*A01K 29/00* (2006.01)
(Continued)

(52) U.S. Cl.
CPC .......... *A01K 57/00* (2013.01); *A01K 15/023* (2013.01); *A01K 29/00* (2013.01);
(Continued)

(58) Field of Classification Search
CPC .......... A01M 29/00; A01M 9/06; A01K 5/02; A01K 5/0291; A01K 29/00; A01K 29/005;
(Continued)

(56) References Cited

U.S. PATENT DOCUMENTS

| 5,595,444 A | 1/1997 | Tong et al. |
| 9,538,729 B2 | 1/2017 | Yarden |

(Continued)

FOREIGN PATENT DOCUMENTS

| CN | 104156821 | 11/2014 |
| CN | 105425815 | 3/2016 |

(Continued)

OTHER PUBLICATIONS

Mobility Scoring—https://dairy.ahdb.org.uk/technical-information/animal-health-welfare/lameness/husbandry-prevention/mobility-scoring#.W-m6s5NKjGg (last visited on Nov. 14, 2018).

(Continued)

*Primary Examiner* — Van T Trieu
(74) *Attorney, Agent, or Firm* — F. Chau & Associates, LLC

(57) ABSTRACT

A method of managing livestock includes selecting an area of interest (AOI) from among a plurality of AOIs as a target AOI, defining a route along which livestock is to be guided to the target AOI, guiding the livestock to the target AOI via the defined route using an unmanned aerial vehicle (UAV), identifying a stress condition of the livestock using the UAV, and reducing the stress condition of the livestock using the UAV. Identifying the stress condition includes identifying an animal not belonging to the livestock causing stress in at least one animal belonging to the livestock. Reducing the stress condition includes diverting the identified animal not belonging to the livestock away from the livestock by adjusting the distance of the UAV relative to the identified animal.

20 Claims, 6 Drawing Sheets

(51) Int. Cl.
*A01K 15/02* (2006.01)
*G06F 16/535* (2019.01)
*G01C 23/00* (2006.01)
*G08B 21/02* (2006.01)

(52) U.S. Cl.
CPC .... *B64C 2201/12* (2013.01); *B64C 2201/126* (2013.01); *B64C 2201/127* (2013.01); *G01C 23/00* (2013.01); *G06F 16/535* (2019.01); *G08B 21/0269* (2013.01)

(58) Field of Classification Search
CPC ...... A01K 15/02; A01K 15/023; A01K 57/00; B64C 39/024; B64C 2201/12; B64C 2201/127; B64C 2201/128; B64D 1/12; B64D 1/22; G06F 16/535
See application file for complete search history.

(56) References Cited

U.S. PATENT DOCUMENTS

| | | |
|---|---|---|
| 9,773,419 B1 | 9/2017 | Gordon et al. |
| 9,943,387 B2 | 4/2018 | Fobi et al. |
| 10,420,322 B2 * | 9/2019 | Jones .................... B64C 39/024 |
| 2016/0327959 A1 | 11/2016 | Brown et al. |
| 2017/0086428 A1 | 3/2017 | Horton et al. |
| 2017/0086429 A1 | 3/2017 | Horton et al. |
| 2017/0202185 A1 | 7/2017 | Trumbull et al. |
| 2017/0329339 A1 | 11/2017 | Gordon et al. |
| 2018/0027772 A1 | 2/2018 | Gordon et al. |
| 2018/0049407 A1 | 2/2018 | Castelli et al. |
| 2018/0146645 A1 | 5/2018 | Arbel |
| 2020/0143157 A1 * | 5/2020 | Borchersen ............... G06T 7/62 |
| 2020/0156784 A1 * | 5/2020 | Carnell ................... B64C 39/02 |

FOREIGN PATENT DOCUMENTS

| | | |
|---|---|---|
| CN | 205196634 | 5/2016 |
| CN | 2052298609 | 5/2016 |
| KR | 10-2008-0000266 | 1/2008 |
| KR | 10-1536095 | 7/2015 |
| KR | 10-2016-0092538 | 8/2016 |
| KR | 10-2016-0094589 | 8/2016 |
| WO | 2013041636 | 3/2013 |
| WO | 2016189524 | 1/2016 |
| WO | 2017001538 | 1/2017 |

OTHER PUBLICATIONS

Mesh network—http://www.falker.com.br/produto-farmlink-controle-irrigacao.php (last visited on Nov. 14, 2018).

* cited by examiner

LIVESTOCK MANAGEMENT

BACKGROUND

The following relates generally to livestock management, and more specifically to livestock management using a system of unmanned aerial vehicles (UAV)s.

Livestock is one of the world's most important food sources. Thus, many systems have been developed to monitor livestock and mitigate the impact of environmental and health issues that impact them. For example, many herds of cattle are monitored by people observing them on foot, from a vehicle, or on horseback.

However, many forms of livestock monitoring provide insufficiently close observation. Lack of data can result in avoidable stress, unmet needs, overheating, inefficient grazing, and reduced health. Additionally, the process of monitoring can also cause stress (e.g., invasive sensors, or monitoring activities that trigger a fight-or-flight reaction). Stress can lead to poor quality meat, reduced milk production, reduced fertility, and loss of cattle.

SUMMARY

According to an exemplary embodiment, a method of managing livestock includes selecting an area of interest (AOI) from among a plurality of AOIs as a target AOI, defining a route along which livestock is to be guided to the target AOI, guiding the livestock to the target AOI via the defined route using an unmanned aerial vehicle (UAV), identifying a stress condition of the livestock using the UAV, and reducing the stress condition of the livestock using the UAV. Identifying the stress condition includes identifying an animal not belonging to the livestock causing stress in at least one animal belonging to the livestock. Reducing the stress condition includes diverting the identified animal not belonging to the livestock away from the livestock by adjusting the distance of the UAV relative to the identified animal.

According to an exemplary embodiment, a livestock management system includes an unmanned aerial vehicle (UAV) including a GPS sensor, an environmental sensor, and a camera, a memory storing a computer program, and a processor that executes the computer program. The computer program is configured to select an area of interest (AOI) from among a plurality of AOIs as a target AOI, define a route along which livestock is to be guided to the target AOI, guide the livestock to the target AOI via the defined route using the UAV, identify a stress condition of the livestock using the UAV, and reduce the stress condition of the livestock using the UAV. Identifying the stress condition includes identifying, using the camera, an animal not belonging to the livestock causing stress in at least one animal belonging to the livestock. Reducing the stress condition includes diverting the identified animal not belonging to the livestock away from the livestock by adjusting the distance of the UAV relative to the identified animal.

According to an exemplary embodiment, a computer program product includes a computer readable storage medium having program instructions embodied therewith, the program instructions executable by a processor to cause the processor to select an area of interest (AOI) from among a plurality of AOIs as a target AOI, define a route along which livestock is to be guided to the target AOI, guide the livestock to the target AOI via the defined route using an unmanned aerial vehicle (UAV), identify a stress condition of the livestock using the UAV, and reduce the stress condition of the livestock using the UAV. Identifying the stress condition includes identifying, using the camera, an animal not belonging to the livestock causing stress in at least one animal belonging to the livestock. Reducing the stress condition includes diverting the identified animal not belonging to the livestock away from the livestock by adjusting the distance of the UAV relative to the identified animal.

DETAILED DESCRIPTION

Systems and methods for managing livestock are described. The system includes unmanned aerial vehicles (UAV)s which may monitor livestock in pasture without disturbing them. In some cases, each UAV is tasked with an adaptive mission that may include monitoring patterns and mitigation activities. The system also employs distributed support docks that facilitate management of scale to large pastures. Monitoring livestock with UAVs may reduce exposure to stress and enable collection of more data, which may be used to predict and mitigate stress situations. Thus, the described systems and methods may result in improved livestock health and increased food quality. For example, the system may enable identification of individual animals, monitoring of interactions between individuals, monitoring of mobility parameters, and identification of pasture conditions such as environmental factors and the availability of feed. This may result in reduced stress, improved wellness, increased fertility, improved milk production, and improved meat quality.

The disclosed systems consider multiple metrics obtained through non-invasive methods. In some cases, the system may also be used to identify livestock theft and threats from predators. The system may also be used to guide livestock to the best areas of pasture considering temperature, humidity, and grass condition, among other factors. Monitoring individuals and the environment supports the identification of stress situations and actions that a UAV can perform to mitigate or reduce its impact on the livestock.

Figure 1:
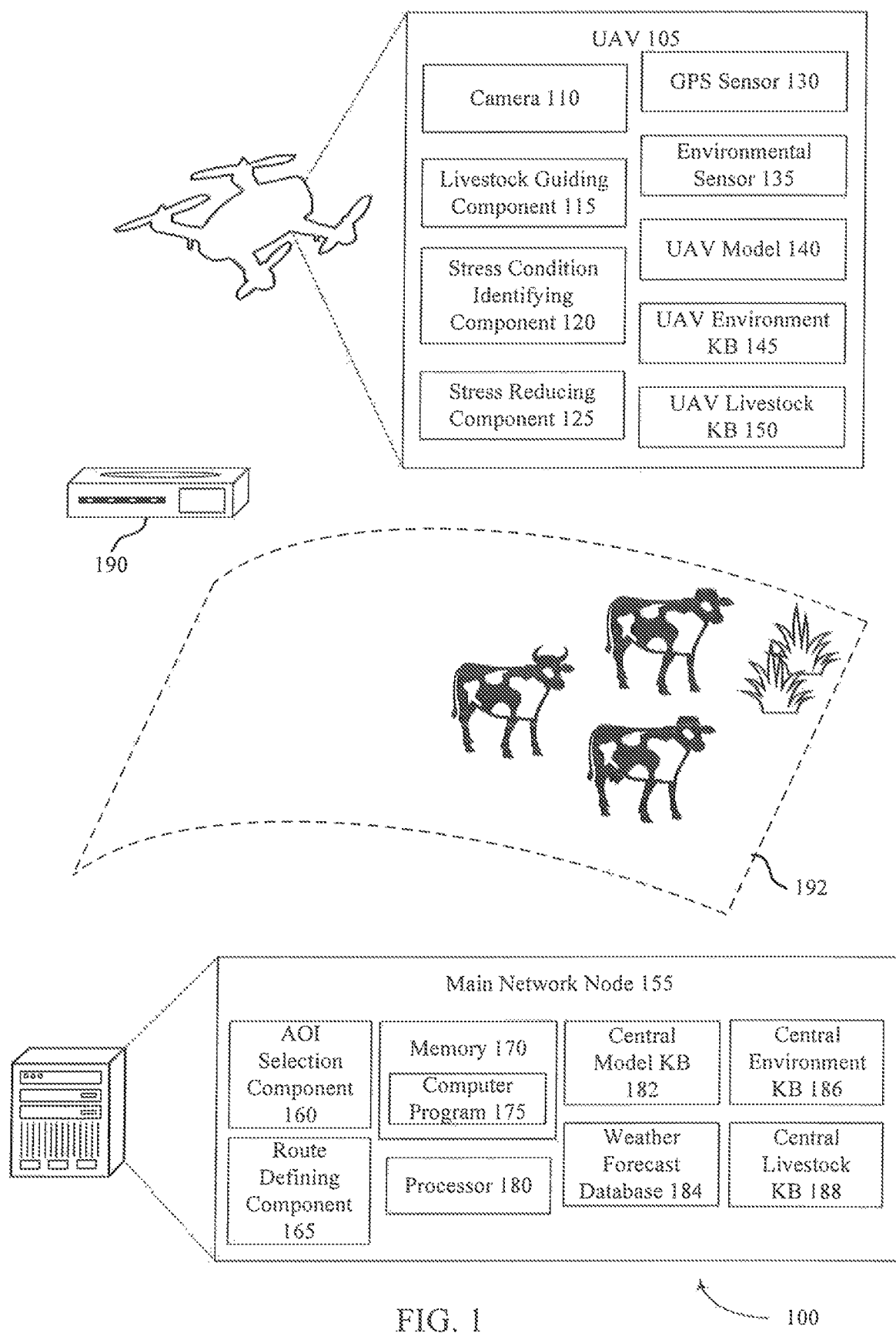
FIG. 1 shows an example of a livestock management system in accordance with aspects of the present disclosure.

FIG. 1 shows an example of a livestock management system 100 in accordance with aspects of the present disclosure. The example shown includes livestock management system 100 and field 192.

Livestock management system 100 may include UAV 105, main network node 155, and support dock 190.

The livestock management system 100 may utilize a data model that includes a set of unmanned aerial vehicle (UAV)s 105, maps, route(s), and rules or tasks. Once created, the data model may be instantiated on the UAVs, and the UAVs 105 can be dispatched individually or in groups to collaborate on the tasks. The rules and tasks may relate to livestock guidance, stress reduction, and general operational guidelines. Rules and tasks related to livestock guidance may include instructions for reducing the distance between a UAV 105 and a livestock centroid, and interventions to guide individual animals that stray too far from the group. In some cases, UAVs 105 may redirect livestock as a result of weather changes (e.g., to avoid heat stress).

The tasks and rules related to livestock guidance may take into account a UAV 105's altitude and may include approximation of effects that the UAVs 105 actions may have on the livestock. The UAV 105 may also take into account that interventions could cause stress if performed too close to the livestock. Hence, the effects of coming close to livestock may be recorded, and actions may be adapted to reduce stress based on the recorded effects (e.g., taking into account parameters such as altitude and proximity to the livestock). Rules and tasks related to reducing stress may include flagging animals that cause stress in other individuals (which may trigger intervention by a specialist), and reacting to fauna external to the livestock (e.g., an animal that comes close to the livestock and triggers fight-or-flight mechanisms, which are strongly related to stress).

Stress conditions can be detected by detecting mobility changes and also by detecting and identifying external animals (e.g., via computer vision algorithms) If an external animal is detected, mitigation procedures may be triggered. For example, the UAV 105 closest to the external animal may approach it in order to move it away from the livestock. If the intruder is not interfering in the behavior or mobility patterns of the livestock, then the UAV 105 that approached the external animal may return to another task (e.g., a livestock guidance task).

The livestock management system 100 may also have rules and tasks related to situations involving an attempt to steal livestock. For example, if collected data matches a pattern that indicates a high probability that an attempt to steal livestock is in progress, the livestock management system 100 may record the activity and initiate communication with a central authority. In one embodiment, the UAV 105 could proceed to an altitude that facilitates registering of the attempt, without exposing the UAV 105 to damage caused by strangers. The tasks and rules related to the UAV 105's operation may include consideration of UAV 105 status parameters. For example, if a battery level reaches a threshold minimum, the UAV 105 may return to a support dock 190.

UAVs 105 may also monitor flight conditions to avoid compromising the mission. For instance, if high speed winds compromise a UAVs 105 security, the condition may trigger the task of returning to the dock and waiting for acceptable flight conditions. In some examples, the information collected by the livestock management system 100 may be recorded in a shared ledger (e.g., a blockchain), which may promote comprehensive and safe tracking by producers and retailers in order to promote food quality. For example, using the collected information stored in the shared ledger, prices for cattle belonging to the livestock can be set and adjusted based on the collected information (e.g., based on stress levels and stress history of the cattle). For example, prices for cattle having lower stress levels may be set to be higher than prices for cattle having higher stress levels.

Referring to the UAV 105, a UAV model 140 may include information related to the tasks and operational parameters of the UAV 105. A UAV environment KB 145 may include observations and forecasts related to environmental factors. A UAV livestock KB 150 may include information related to livestock, including information about individual animals. Data collected by each UAV 105 is used to update the UAV model 140, the UAV environment KB 145, and the UAV livestock KB 150, and may then be uploaded to the main network node 155. Herein, the terms "database" and "knowledge base (KB)" may be used interchangeably.

The main network node 155 may maintain a weather forecast database 184 including data such as forecasts for temperature, precipitation, humidity, and wind speeds. A central environment KB 186 may include other information relating to the environment such as location information, and observations about locations. The central environment KB 186 may also include fauna and flora information (e.g., to inform the UAVs 105 regarding what plants and animals to expect in the vicinity of the pasture). The main network node 155 may also maintain a central model KB 182, which may include information regarding tasks and operational parameters of the UAVs 105 within the livestock management system 100. The main network node 155 may also maintain a central livestock KB 188 which may include information related to livestock, including information about individual animals such as information collected from UAVs 105.

UAV 105 may include, for example, camera 110, livestock guiding component 115, stress condition identifying component 120, stress reducing component 125, GPS sensor 130, environmental sensor 135, UAV model 140, UAV environment KB 145, and UAV livestock KB 150.

Each of the livestock guiding component 115, the stress condition identifying component 120, and the stress reducing component 125 may be implemented by, for example, a processor executing instructions stored in a memory. For example, a processor(s) may execute the operations of each of these components to cause UAV 105 to perform certain tasks.

Camera 110 may capture an image of the animal not belonging to the livestock and may also monitor a location including the livestock and an area surrounding the livestock.

Livestock guiding component 115 may guide the livestock to the target area of interest (AOI) via the defined route using a UAV 105. For example, livestock guiding component 115 may decrease the altitude of the UAV 105 relative to the livestock until a first change of behavior of the livestock indicating an increased stress condition occurs, and then increase the altitude of the UAV 105 relative to the livestock, after decreasing the altitude of the UAV 105 relative to the livestock, until a second change of behavior of the livestock indicating a decreased stress condition occurs. As a result, the livestock may be effectively guided to the target AOI by the movement of a UAV(s) 105, while stress caused by the presence of the UAV(s) 105 may be mitigated by flying the UAV(s) 105 at a certain location and at a certain distance away from the livestock.

Thus, a UAV 105 may guide livestock using proximity to the livestock (e.g., the appearance and sound of the propellers may impact livestock movement). Thus, if a group of cattle is going in the desired direction (i.e., to the AOI), then the one or more UAV(s) 105 may follow the herd at a relatively high altitude, avoiding causing stress. If the herd is getting off route, one or more UAV(s) 105 close to the part of the herd going off the track may reduce altitude and get closer to this portion of the herd, guiding them to the main portion of the herd and to the right AOI path.

Thus, livestock guiding component 115 may determine a preferred altitude of the UAV 105 relative to the livestock by repeatedly decreasing and increasing the altitude of the UAV 105 relative to the livestock until a behavior of the livestock is stabilized. Livestock guiding component 115 may store the preferred altitude of the UAV 105 relative to the livestock in a database (e.g., the central model KB 182), and may adjust the predefined altitude of the UAV 105 relative to the livestock for future livestock management operations based on the preferred altitude.

Livestock guiding component 115 may decrease the distance of the UAV 105 relative to the livestock until a first change of behavior of the livestock indicating an increased stress condition occurs, and may then increase the distance of the UAV 105 relative to the livestock, after decreasing the distance of the UAV 105 relative to the livestock, until a second change of behavior of the livestock indicating a decreased stress condition occurs.

For example, livestock guiding component 115 may determine a preferred distance of the UAV 105 relative to the livestock by repeatedly decreasing and increasing the distance of the UAV 105 relative to the livestock until a behavior of the livestock is stabilized (e.g., until the livestock is being effectively shepherded and is not being negatively affected by stress caused by the shepherding process). Livestock guiding component 115 may store the preferred distance of the UAV 105 relative to the livestock in a database (e.g., the central model KB 182). Livestock guiding component 115 may also adjust the predefined distance of the UAV 105 relative to the livestock for future livestock management operations based on the preferred distance.

Livestock guiding component 115 may identify a member of the livestock straying away from the livestock. In response, livestock guiding component 115 may fly the UAV 105 to a position behind the member of the livestock, and may guide the member of the livestock toward the livestock by flying the UAV 105 in a direction toward the member of the livestock and toward the livestock.

In some examples, guiding the livestock to the target AOI via the defined route includes shepherding the livestock along the defined route toward the target AOI by flying the UAV 105 at a predefined altitude above the livestock and at a predefined distance behind the livestock in a direction toward the target AOI.

Stress condition identifying component 120 may identify a stress condition of the livestock using the UAV 105. Stress condition identifying component 120 may compare a captured image (e.g., an image captured by the camera 110) with a plurality of images stored in a database (e.g., the central livestock KB 188), in which the plurality of images represent an animal type of the livestock. Stress condition identifying component 120 may identify the animal not belonging to the livestock based on the comparison.

Stress condition identifying component 120 may identify a first mobility pattern of the livestock in the monitored location, and may identify a second mobility pattern of the animal not belonging to the livestock in the monitored location. For example, animals belonging to the livestock may have substantially the same mobility pattern, and the animal not belonging to the livestock may have a substantially different mobility pattern. Stress condition identifying component 120 may identify the animal not belonging to the livestock based on a comparison of the first mobility pattern and the second mobility pattern.

In some examples, identifying the stress condition includes identifying an animal not belonging to the livestock (e.g., a predator) causing stress in at least one animal belonging to the livestock. In some examples, identifying the stress condition of the livestock includes identifying an animal belonging to the livestock (e.g., an overly aggressive livestock member) causing stress in another animal belonging to the livestock. In some examples, identifying the stress condition of the livestock includes identifying an unauthorized person near the livestock.

As an example of a stress condition, a dispute for space may occur between individual animals. An individual, especially a strong one individual such as an alpha, may be stressed due to a lack of space and, hence, the stressed individual could try to force nearby individuals to increase their distance from the stressed animal. However, this behavior might cause additional stress to other individuals.

Stress reducing component 125 may reduce the stress condition of the livestock using the UAV 105. For example, stress reducing component 125 controls the UAV 105 to perform the stress reducing operations described herein.

In some examples, reducing the stress condition includes diverting the identified animal not belonging to the livestock away from the livestock by adjusting the distance of the UAV 105 relative to the identified animal. In some examples, reducing the stress condition includes flying the UAV 105 closer to the animal not belonging to the livestock until the animal not belonging to the livestock is diverted away from the livestock. In some examples, the UAV 105 stops guiding the livestock to the target AOI when the stress condition is identified, and resumes guiding the livestock to the target AOI when the animal not belonging to the livestock is diverted away from the livestock. In some examples, reducing the stress condition includes transmitting, from the UAV 105 to the main network node 155, identification information identifying the identified animal belonging to the livestock causing stress in the another animal belonging to the livestock. In some examples, reducing the stress condition includes transmitting, from the UAV 105 to the main network node 155, identification information identifying the unauthorized person.

Main network node 155 may include AOI selection component 160, route defining component 165, memory 170 including a computer program 175, processor 180, central model KB 182, weather forecast database 184, central environment KB 186, and central livestock KB 188.

AOI selection component 160 may select an area of interest (AOI) from among a plurality of AOIs as a target AOI. In some examples, selecting the AOI as the target AOI is based on at least one of a weather forecast of each of the plurality of AOIs, environmental data of each of the plurality of AOIs, or geographic data of each of the plurality of AOIs. Route defining component 165 may define a route along which livestock is to be guided to the target AOI. Each of the AOI selection component and the route defining component 165 may be implemented by, for example, a processor executing instructions stored in a memory.

Figure 2:
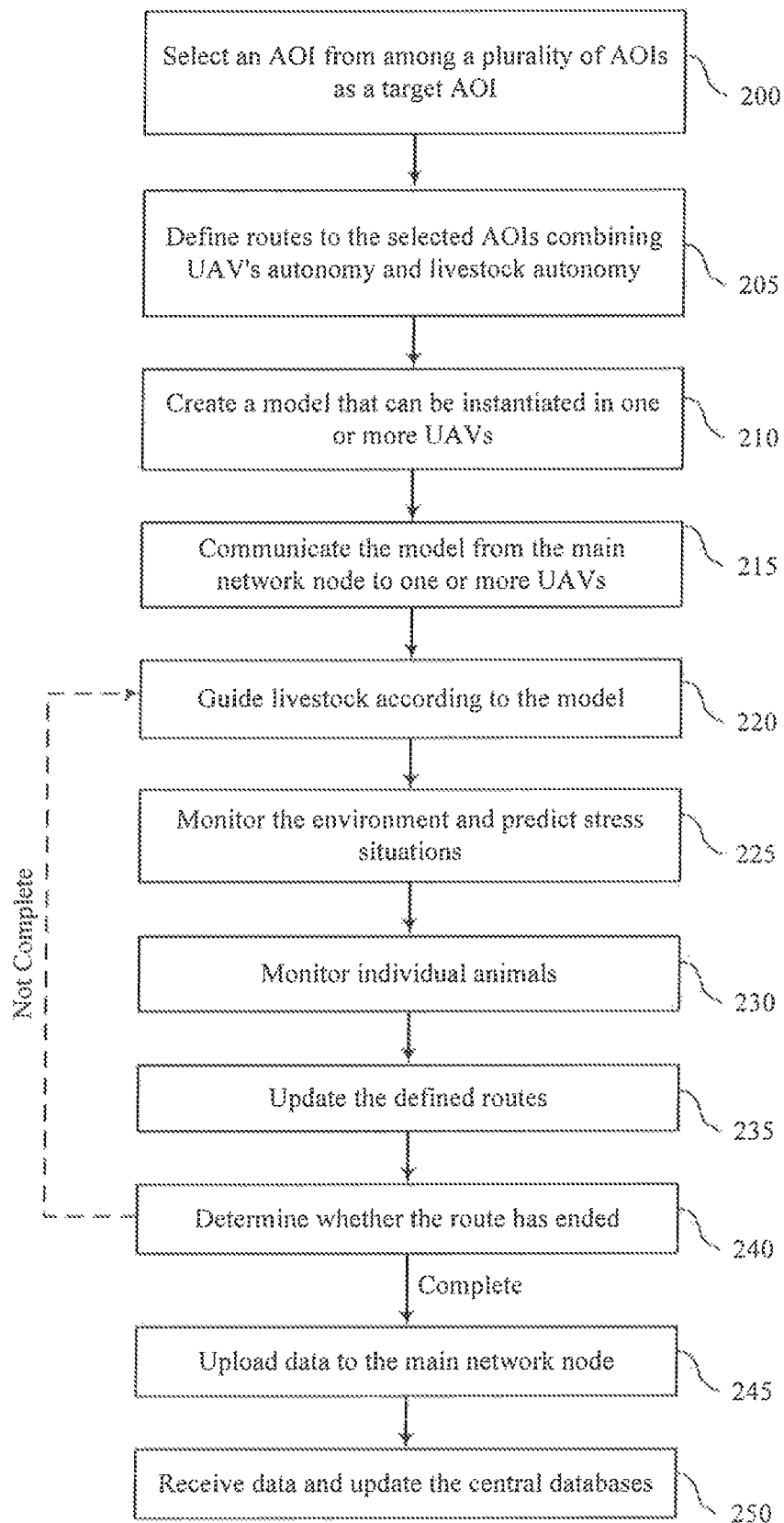
FIG. 2 shows an example of a process for managing livestock in accordance with aspects of the present disclosure.

FIG. 2 shows an example of a process for managing livestock in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 200, a system may define areas of interest (AOI) in the pasture where the livestock is going to be managed. The AOI may be based on weather forecast data and a knowledge base regarding the environment to define areas that the livestock should be guided to. In an exemplary embodiment the system may consider the greenness or maturity of the grass in different AOIs, temperature, humidity of the AOIs, and physical barriers (e.g., a river). In cases where there is no previous mapping of the region, the first task may be to map the pasture and establish baseline environmental conditions. In some cases, the operations of this step may refer to, or be performed by, the AOI selection component 160 as described with reference to FIG. 1.

At step 205, the system may define routes to the selected AOIs combining UAV 105's autonomy and livestock autonomy. The UAV 105's autonomy is combined with the docks spread over the pasture. In this step, the system may also consider specific information from individual animals, combining mobility metrics to match the defined route for the livestock. According to the pasture development (e.g., stored in the central environment KB 186) or a user defined period, the route definition can be performed for a specific day or for different periods (e.g., for a week, 15 days, or a month). In some cases, the operations of this step may refer to, or be performed by, the route defining component 165 as described with reference to FIG. 1.

At step 210, the system may create a model that can be instantiated in one or more UAVs 105. The model can be defined for a period of time (e.g., a day or week). The model specifies expected environmental characteristics (e.g., weather, precipitation), characteristics of individual animals, and actions to take when any of the characteristics change from the expected behavior. For example, the model may enable identification of metric outliers. Examples of ways to calculate outliers include, but are not restricted to, using mean plus/minus standard deviation measures and interquartile ranges.

At step 215, the system may communicate the model from the main network node 155 to one or more UAVs 105.

At step 220, the system may guide livestock according to the model. The guidance includes the rules considering the objectives of keeping the herd in the route and reducing stress factors. In some cases, the operations of this step may refer to, or be performed by, the livestock guiding component 115 as described with reference to FIG. 1.

At step 225, the system may monitor the environment and predict stress situations. If environmental factors indicate a likelihood of a stress situation, a UAV 105 may respond with actions to avoid the stress based on previously stored information. In some cases, the operations of this step may refer to, or be performed by, the stress condition identifying component 120 as described with reference to FIG. 1.

At step 230, the system may monitor individual animals, including stress events, mobility, and interactions with other individuals. In some cases, the operations of this step may refer to, or be performed by, the UAV 105 as described with reference to FIG. 1.

At step 235, the system may update the defined routes based on the observations of the environment and the individual animals.

At step 240, the system may determine whether the route has ended. If the route has not yet ended, the system returns to step 220.

At step 245, the system may upload data from the UAVs 105 to the main network node 155.

At step 250, the system may receive data from the UAVs and update the central databases (e.g., the databases and KBs located in the main network node 155).

Figure 3:
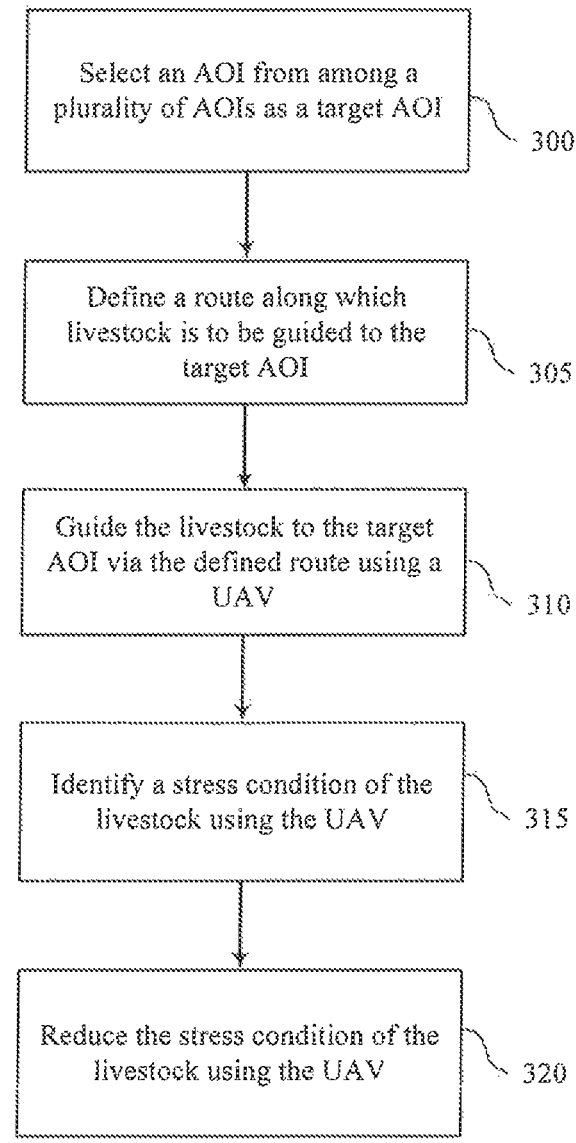
FIG. 3 shows an example of a process for managing livestock in accordance with aspects of the present disclosure.

FIG. 3 shows an example of a process for managing livestock in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 300, a system may select an area of interest (AOI) from among a plurality of AOIs as a target AOI. In some cases, the operations of this step may refer to, or be performed by, the AOI selection component 160 as described with reference to FIG. 1.

At step 305, the system may define a route along which livestock is to be guided to the target AOI. In some cases, the operations of this step may refer to, or be performed by, the route defining component 165 as described with reference to FIG. 1.

At step 310, the system may guide the livestock to the target AOI via the defined route using at least one UAV 105. In some cases, the operations of this step may refer to, or be performed by, the livestock guiding component 115 as described with reference to FIG. 1.

At step 315, the system may identify a stress condition of the livestock using the UAV 105. As described above, identifying the stress condition may include, for example, identifying an animal not belonging to the livestock causing stress in at least one animal belonging to the livestock. In some cases, the operations of this step may refer to, or be performed by, the stress condition identifying component 120 as described with reference to FIG. 1.

At step 320, the system may reduce the stress condition of the livestock using the at least one UAV 105. As described above, reducing the stress condition may include, for example, diverting the identified animal not belonging to the livestock away from the livestock by adjusting the distance of the UAV 105 relative to the identified animal. In some cases, the operations of this step may refer to, or be performed by, the stress reducing component 125 as described with reference to FIG. 1.

Figure 4:
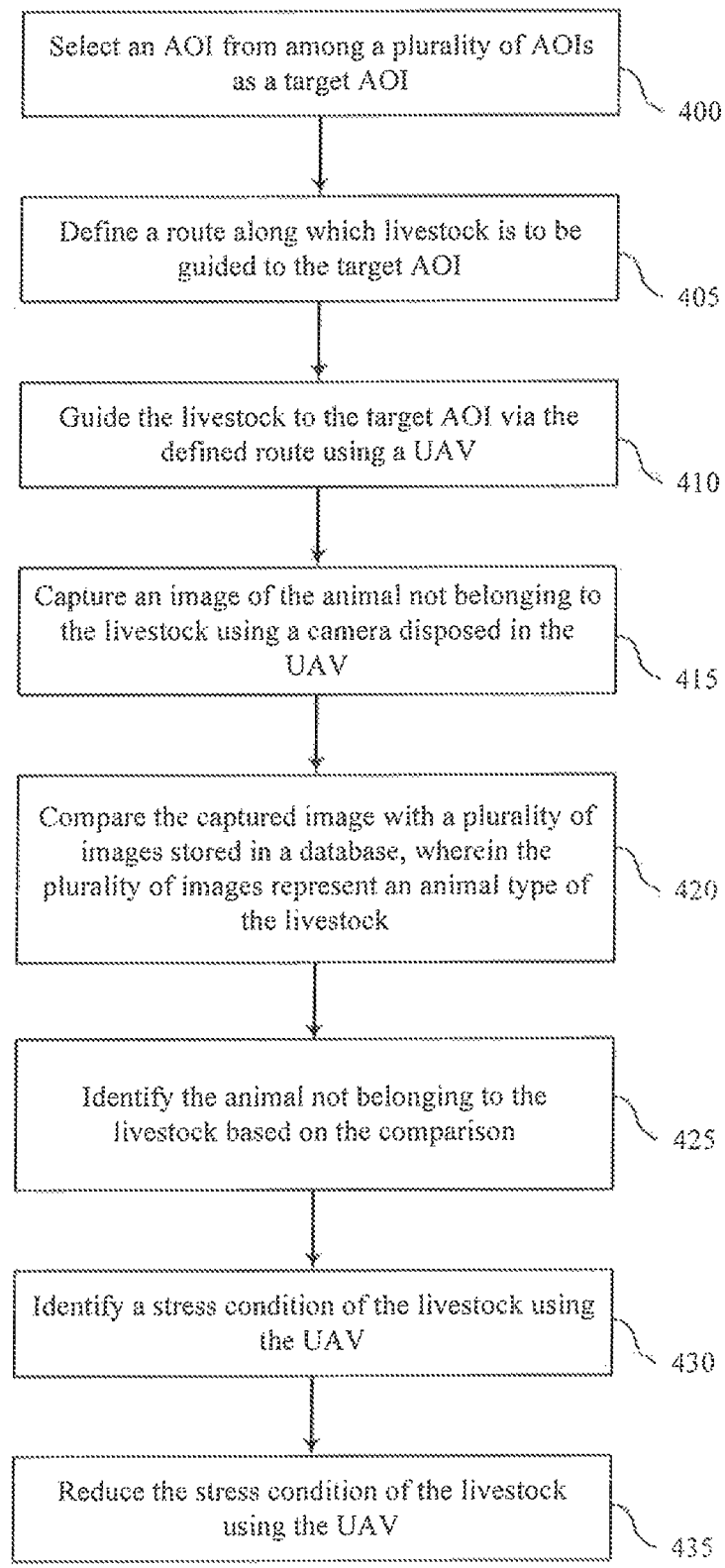
FIG. 4 shows an example of a process for managing livestock in accordance with aspects of the present disclosure.

FIG. 4 shows an example of a process for managing livestock in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 400, a system may select an area of interest (AOI) from among a plurality of AOIs as a target AOI. In some cases, the operations of this step may refer to, or be performed by, the AOI selection component 160 as described with reference to FIG. 1.

At step 405, the system may define a route along which livestock is to be guided to the target AOI. In some cases, the operations of this step may refer to, or be performed by, the route defining component 165 as described with reference to FIG. 1.

At step 410, the system may guide the livestock to the target AOI via the defined route using at least one UAV 105. In some cases, the operations of this step may refer to, or be performed by, the livestock guiding component 115 as described with reference to FIG. 1.

At step 415, the system may capture an image of the animal not belonging to the livestock using the camera 110 disposed in the UAV 105.

At step 420, the system may compare the captured image with a plurality of images stored in a database (e.g., the central livestock KB 188), in which the plurality of images represent an animal type of the livestock.

At step 425, the system may identify the animal not belonging to the livestock based on the comparison. For example, when the image captured does not match the plurality of images representing the livestock, it may be determined that the animal in the captured image does not belong to the livestock. In some cases, the operations of this step may refer to, or be performed by, the stress condition identifying component 120 as described with reference to FIG. 1.

At step 430, the system may identify a stress condition of the livestock using the UAV 105. In some cases, the operations of this step may refer to, or be performed by, the stress condition identifying component 120 as described with reference to FIG. 1.

At step 435, the system may reduce the stress condition of the livestock using the UAV 105. In some cases, the operations of this step may refer to, or be performed by, the stress reducing component 125 as described with reference to FIG. 1.

Figure 5:
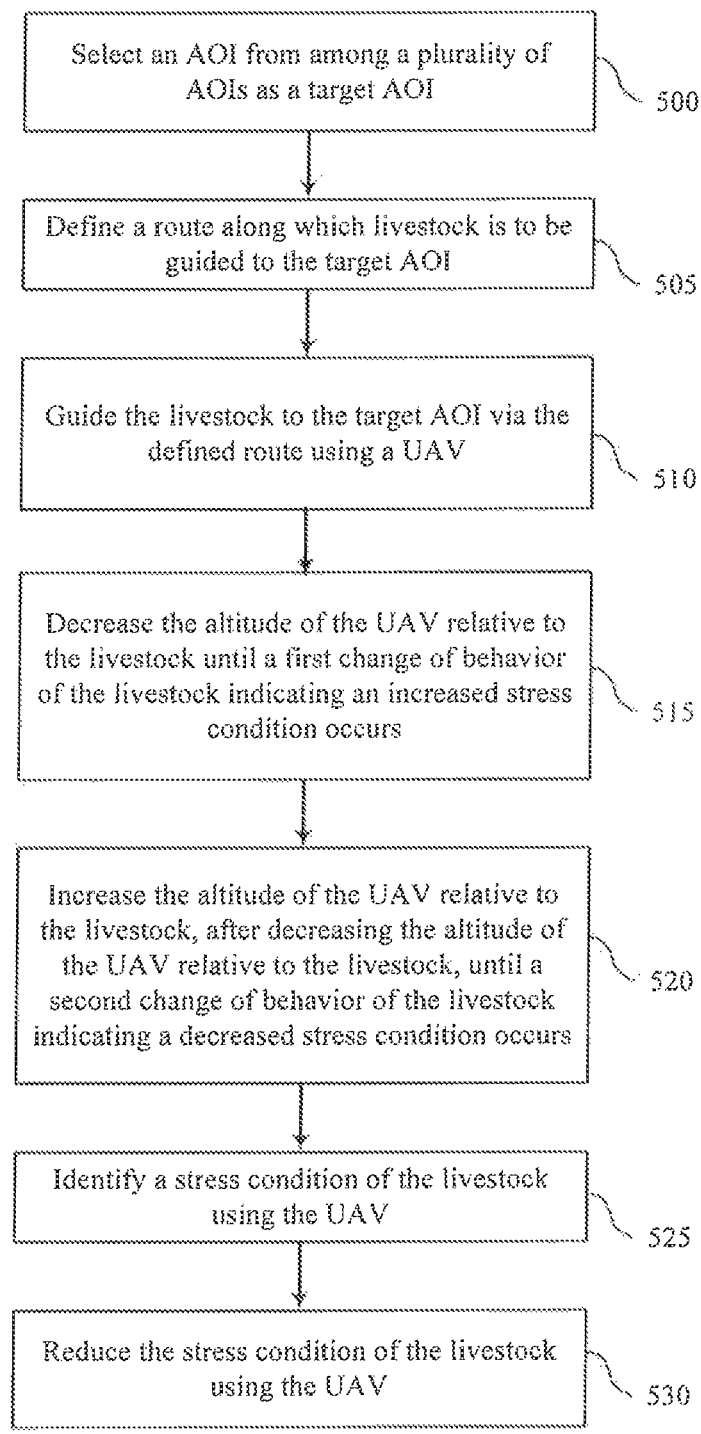
FIG. 5 shows an example of a process for managing livestock in accordance with aspects of the present disclosure.

FIG. 5 shows an example of a process for managing livestock in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, a system may select an area of interest (AOI) from among a plurality of AOIs as a target AOI. In some cases, the operations of this step may refer to, or be performed by, the AOI selection component 160 as described with reference to FIG. 1.

At step 505, the system may define a route along which livestock is to be guided to the target AOI. In some cases, the operations of this step may refer to, or be performed by, the route defining component 165 as described with reference to FIG. 1.

At step 510, the system may guide the livestock to the target AOI via the defined route using at least one UAV 105. Guiding the livestock to the target AOI via the defined route may include shepherding the livestock along the defined route toward the target AOI by flying the at least one UAV 105 at a predefined altitude above the livestock and at a predefined distance behind the livestock in a direction toward the target AOI. In some cases, the operations of this step may refer to, or be performed by, the livestock guiding component 115 as described with reference to FIG. 1.

At step 515, the system may decrease the altitude of the at least one UAV 105 relative to the livestock until a first change of behavior of the livestock indicating an increased stress condition occurs. In some cases, the operations of this step may refer to, or be performed by, the livestock guiding component 115 as described with reference to FIG. 1.

At step 520, the system may increase the altitude of the at least one UAV 105 relative to the livestock, after decreasing the altitude of the at least one UAV 105 relative to the livestock, until a second change of behavior of the livestock indicating a decreased stress condition occurs. In some cases, the operations of this step may refer to, or be performed by, the livestock guiding component 115 as described with reference to FIG. 1.

At step 525, the system may identify a stress condition of the livestock using the at least one UAV 105. In some cases, the operations of this step may refer to, or be performed by, the stress condition identifying component 120 as described with reference to FIG. 1.

At step 530, the system may reduce the stress condition of the livestock using the at least one UAV 105. In some cases, the operations of this step may refer to, or be performed by, the stress reducing component 125 as described with reference to FIG. 1.

Figure 6:
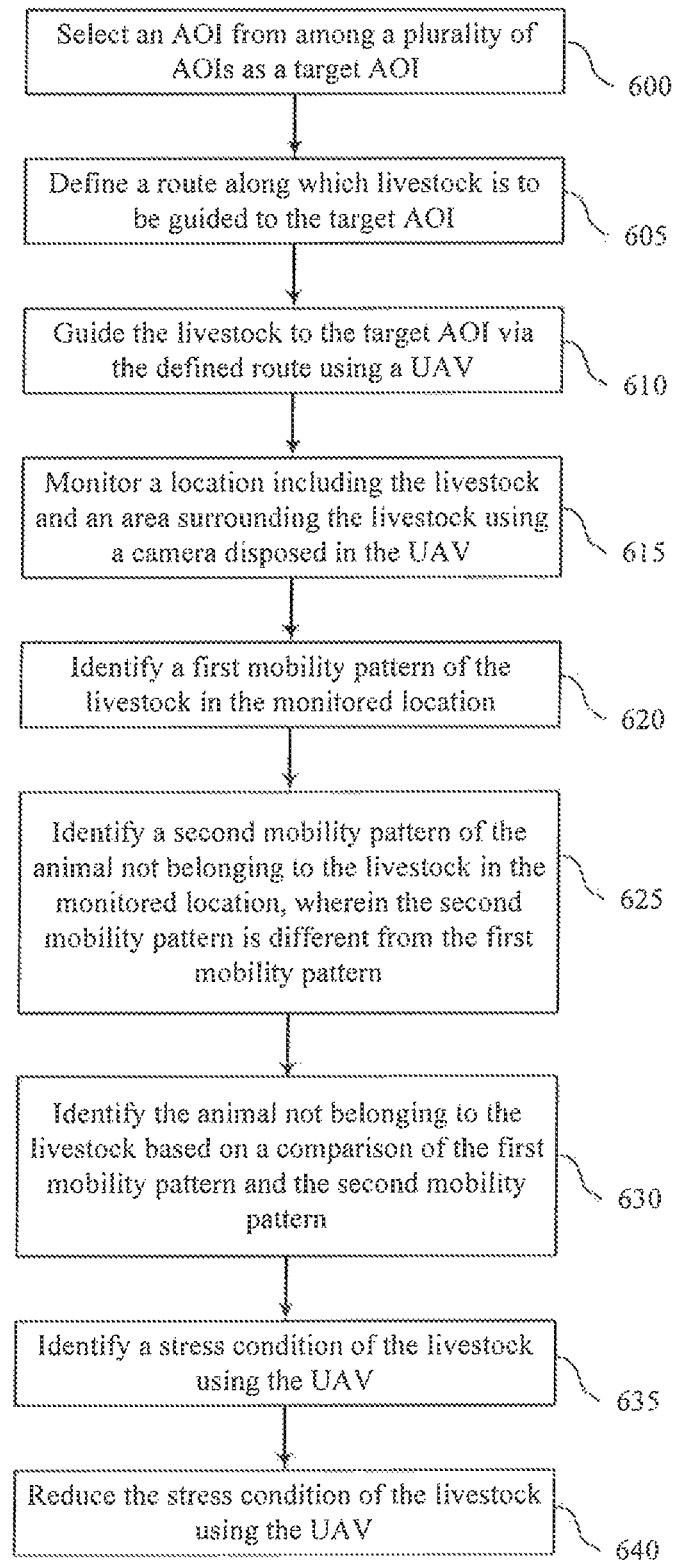
FIG. 6 shows an example of a process for managing livestock in accordance with aspects of the present disclosure.

FIG. 6 shows an example of a process for managing livestock in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 600, a system may select an area of interest (AOI) from among a plurality of AOIs as a target AOI. In some cases, the operations of this step may refer to, or be performed by, the AOI selection component 160 as described with reference to FIG. 1.

At step 605, the system may define a route along which livestock is to be guided to the target AOI. In some cases, the operations of this step may refer to, or be performed by, the route defining component 165 as described with reference to FIG. 1.

At step 610, the system may guide the livestock to the target AOI via the defined route using at least one UAV 105. In some cases, the operations of this step may refer to, or be performed by, the livestock guiding component 115 as described with reference to FIG. 1.

At step 615, the system may monitor a location including the livestock and an area surrounding the livestock using the camera 110 disposed in the UAV 105.

At step 620, the system may identify a first mobility pattern of the livestock in the monitored location. In some cases, the operations of this step may refer to, or be performed by, the stress condition identifying component 120 as described with reference to FIG. 1.

At step 625, the system may identify a second mobility pattern of the animal not belonging to the livestock in the monitored location, wherein the second mobility pattern is different from the first mobility pattern. In some cases, the operations of this step may refer to, or be performed by, the stress condition identifying component 120 as described with reference to FIG. 1.

At step 630, the system may identify the animal not belonging to the livestock based on a comparison of the first mobility pattern and the second mobility pattern. In some cases, the operations of this step may refer to, or be performed by, the stress condition identifying component 120 as described with reference to FIG. 1.

At step 635, the system may identify a stress condition of the livestock using the at least one UAV 105. In some cases, the operations of this step may refer to, or be performed by, the stress condition identifying component 120 as described with reference to FIG. 1.

At step 640, the system may reduce the stress condition of the livestock using the at least one UAV 105. In some cases, the operations of this step may refer to, or be performed by, the stress reducing component 125 as described with reference to FIG. 1.

Exemplary embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been shown and described with reference to exemplary embodiments thereof, it will be understood by those of ordinary skill in the art that various changes in form and detail may be made therein without departing from the spirit and scope of the present disclosure as set forth by the following claims.

The invention claimed is:

1. A method of managing livestock, comprising:
   selecting an area of interest (AOI) from among a plurality of AOIs as a target AOI;
   defining a route along which livestock is to be guided to the target AOI;
   guiding the livestock to the target AOI via the defined route using an unmanned aerial vehicle (UAV);
   identifying a stress condition of the livestock using the UAV,
   wherein identifying the stress condition comprises identifying an animal not belonging to the livestock causing stress in at least one animal belonging to the livestock; and
   reducing the stress condition of the livestock using the UAV,
   wherein reducing the stress condition comprises diverting the identified animal not belonging to the livestock away from the livestock by adjusting the distance of the UAV relative to the identified animal.

2. The method of claim 1, wherein identifying the stress condition comprises:
   capturing an image of the animal not belonging to the livestock using a camera disposed in the UAV;
   comparing the captured image with a plurality of images stored in a database, wherein the plurality of images represent an animal type of the livestock; and
   identifying the animal not belonging to the livestock based on the comparison.

3. The method of claim 1, wherein identifying the stress condition comprises:
   monitoring a location including the livestock and an area surrounding the livestock using a camera disposed in the UAV;
   identifying a first mobility pattern of the livestock in the monitored location;
   identifying a second mobility pattern of the animal not belonging to the livestock in the monitored location, wherein the second mobility pattern is different from the first mobility pattern; and
   identifying the animal not belonging to the livestock based on a comparison of the first mobility pattern and the second mobility pattern.

4. The method of claim 1, wherein reducing the stress condition comprises:
   flying the UAV closer to the animal not belonging to the livestock until the animal not belonging to the livestock is diverted away from the livestock.

5. The method of claim 4, wherein the UAV stops guiding the livestock to the target AOI when the stress condition is identified, and resumes guiding the livestock to the target AOI when the animal not belonging to the livestock is diverted away from the livestock.

6. The method of claim 1, wherein guiding the livestock to the target AOI via the defined route comprises:
   shepherding the livestock along the defined route toward the target AOI by flying the UAV at a predefined altitude above the livestock and at a predefined distance behind the livestock in a direction toward the target AOI.

7. The method of claim 6, further comprising:
   decreasing the altitude of the UAV relative to the livestock until a first change of behavior of the livestock indicating an increased stress condition occurs; and
   increasing the altitude of the UAV relative to the livestock, after decreasing the altitude of the UAV relative to the livestock, until a second change of behavior of the livestock indicating a decreased stress condition occurs.

8. The method of claim 7, further comprising:
   determining a preferred altitude of the UAV relative to the livestock by repeatedly decreasing and increasing the altitude of the UAV relative to the livestock until a behavior of the livestock is stabilized.

9. The method of claim 8, further comprising:
   storing the preferred altitude of the UAV relative to the livestock in a database; and
   adjusting the predefined altitude of the UAV relative to the livestock for future livestock management operations based on the preferred altitude.

10. The method of claim 6, further comprising:
    decreasing the distance of the UAV relative to the livestock until a first change of behavior of the livestock indicating an increased stress condition occurs; and
    increasing the distance of the UAV relative to the livestock, after decreasing the distance of the UAV relative to the livestock, until a second change of behavior of the livestock indicating a decreased stress condition occurs.

11. The method of claim 10, further comprising:
    determining a preferred distance of the UAV relative to the livestock by repeatedly decreasing and increasing the distance of the UAV relative to the livestock until a behavior of the livestock is stabilized.

12. The method of claim 11, further comprising:
    storing the preferred distance of the UAV relative to the livestock in a database; and
    adjusting the predefined distance of the UAV relative to the livestock for future livestock management operations based on the preferred distance.

13. The method of claim 6, further comprising:
    identifying a member of the livestock straying away from the livestock;
    flying the UAV to a position behind the member of the livestock; and
    guiding the member of the livestock toward the livestock by flying the UAV in a direction toward the member of the livestock and toward the livestock.

14. The method of claim 1, wherein:
identifying the stress condition of the livestock further comprises identifying an animal belonging to the livestock causing stress in another animal belonging to the livestock; and
reducing the stress condition of the livestock further comprises transmitting, from the UAV to a main network node, identification information identifying the identified animal belonging to the livestock causing stress in the another animal belonging to the livestock.

15. The method of claim 1, wherein:
identifying the stress condition of the livestock further comprises identifying an unauthorized person near the livestock; and
reducing the stress condition of the livestock further comprises transmitting, from the UAV to a main network node, identification information identifying the unauthorized person.

16. The method of claim 1, further comprising:
collecting information relating to the livestock using the UAV;
storing the collected information in a shared ledger; and
adjusting a price of the livestock based on the collected information stored in the shared ledger.

17. A livestock management system, comprising:
an unmanned aerial vehicle (UAV) comprising a GPS sensor, an environmental sensor, and a camera;
a memory storing a computer program; and
a processor that executes the computer program, wherein the computer program is a non-transitory computer configured to:
select an area of interest (AOI) from among a plurality of AOIs as a target AOI;
define a route along which livestock is to be guided to the target AOI;
guide the livestock to the target AOI via the defined route using the UAV;
identify a stress condition of the livestock using the UAV, wherein identifying the stress condition comprises identifying, using the camera, an animal not belonging to the livestock causing stress in at least one animal belonging to the livestock; and
reduce the stress condition of the livestock using the UAV, wherein reducing the stress condition comprises diverting the identified animal not belonging to the livestock away from the livestock by adjusting the distance of the UAV relative to the identified animal.

18. The livestock management system of claim 17, wherein the computer program is configured to guide the livestock to the target AOI via the defined route using the UAV by:
shepherding the livestock along the defined route toward the target AOI by flying the UAV at a predefined altitude above the livestock and at a predefined distance behind the livestock in a direction toward the target AOI.

19. A computer program product comprising a non-transitory computer readable storage medium having program instructions embodied therewith, the program instructions executable by a processor to cause the processor to:
select an area of interest (AOI) from among a plurality of AOIs as a target AOI;
define a route along which livestock is to be guided to the target AOI;
guide the livestock to the target AOI via the defined route using an unmanned aerial vehicle (UAV);
identify a stress condition of the livestock using the UAV, wherein identifying the stress condition comprises identifying, using the camera, an animal not belonging to the livestock causing stress in at least one animal belonging to the livestock; and
reduce the stress condition of the livestock using the UAV, wherein reducing the stress condition comprises diverting the identified animal not belonging to the livestock away from the livestock by adjusting the distance of the UAV relative to the identified animal.

20. The computer program product of claim 19, wherein the program instructions executable by the processor cause the processor to guide the livestock to the target AOI via the defined route using the UAV by:
shepherding the livestock along the defined route toward the target AOI by flying the UAV at a predefined altitude above the livestock and at a predefined distance behind the livestock in a direction toward the target AOI.

* * * * *